United States Patent
Wu

(10) Patent No.: US 10,777,333 B2
(45) Date of Patent: Sep. 15, 2020

(54) LASER-BASED FABRICATION OF CARBON NANOTUBE-METAL COMPOSITES ON FLEXIBLE SUBSTRATES

(71) Applicant: Purdue Research Foundation, West Lafayette, IN (US)

(72) Inventor: Benxin Wu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 312 days.

(21) Appl. No.: 15/729,078

(22) Filed: Oct. 10, 2017

(65) Prior Publication Data

US 2018/0102200 A1 Apr. 12, 2018

Related U.S. Application Data

(60) Provisional application No. 62/406,556, filed on Oct. 11, 2016.

(51) Int. Cl.

| | | |
|---|---|---|
| *B32B 9/00* | (2006.01) | |
| *H01B 5/14* | (2006.01) | |
| *B05D 1/26* | (2006.01) | |
| *B05D 3/14* | (2006.01) | |
| *C01B 32/174* | (2017.01) | |
| *H01B 1/04* | (2006.01) | |
| *H01B 1/02* | (2006.01) | |

(52) U.S. Cl.
CPC ............... *H01B 5/14* (2013.01); *B05D 1/26* (2013.01); *B05D 3/14* (2013.01); *C01B 32/174* (2017.08); *H01B 1/02* (2013.01); *H01B 1/04* (2013.01)

(58) Field of Classification Search
CPC .............................. B82Y 30/00; Y10T 428/30
USPC .......................................... 428/408; 423/448
See application file for complete search history.

(56) References Cited

FOREIGN PATENT DOCUMENTS

KR 101756368 B1 7/2017

OTHER PUBLICATIONS

Ko, et al., All-inkjet-printed flexible electronics fabrication on a polymer substrate by low-temperature high-resolution selective laser sintering of metal nanoparticles, Nanotechnology 18 (2007) 345202 (8pp).
Zhao, et al., Conductivity enhancement of aerosol jet printed electronics by using silver nanoparticles ink with carbon nanotubes, Microelectronic Engineering 96 (2012) 71-75.
Huang, et al., Copper Nanoparticle/Multiwalled Carbon Nanotube Composite Films with High Electrical Conductivity and Fatigue Resistance Fabricated via Flash Light Sintering, ACS Appl. Mater. Interfaces 2015, 7, 25413-25423.
Ji, et al., Laser patterning of highly conductive flexible circuits, Nanotechnology 28 (2007) 165301 (7pp).

*Primary Examiner* — Daniel H Miller
(74) *Attorney, Agent, or Firm* — Purdue Research Foundation; Zhigang Rao

(57) ABSTRACT

The present disclosure relates to a novel method of laser-based fabrication of a carbon nanotube (CNT)-metal composite on a flexible substrate, and the fabricated CNT-metal composite that is bonded with the flexible substrate, and that has a high electrical conductivity, and that has a longer bending-fatigue life than the laser-sintered metal of the same type without CNTs onto the flexible substrate.

14 Claims, No Drawings

LASER-BASED FABRICATION OF CARBON NANOTUBE-METAL COMPOSITES ON FLEXIBLE SUBSTRATES

CROSS-REFERENCE TO RELATED APPLICATIONS

The present patent application is related to and claims the priority benefit of U.S. Provisional Patent Application Ser. No. 62/406,556, filed Oct. 11, 2016, the contents of which is hereby incorporated by reference in its entirety into this disclosure.

GOVERNMENT SUPPORT CLAUSE

This invention was made with government support under CMMI 1542376 awarded by the United States National Science Foundation. The government has certain rights in the invention.

TECHNICAL FIELD

The present disclosure relates to a novel method of laser-based fabrication of carbon nanotube (CNT)-metal composites on flexible substrates, and the fabricated CNT-metal composites bonded with flexible substrates.

BACKGROUND

This section introduces aspects that may help facilitate a better understanding of the disclosure. Accordingly, these statements are to be read in this light and are not to be understood as admissions about what is or is not prior art.

Flexible electronics have one or more desirable features, which may include low weight and low consumption of energies, good compactness, superior portability and easiness when being integrated with other devices. It is expected that the market related to flexible electronic devices is going to have a rapid growth. Some related applications for flexible electronics may include flexible displays, sensors and solar cells, etc. However, flexible electronic devices often comprise metallic components (e.g., metallic interconnects) on flexible substrates, and during the use of the devices, they often subject to repeated deformations (for example, bending deformations), and this could cause crack generation and propagation in the metallic components. This may generate risks to the devices' reliability and durability in the long term. Therefore, it is beneficial to have an effective method to fabricate materials with high electrical conductivities and good fatigue properties onto flexible substrates, wherein the fabricated materials can potentially replace at least a portion of metallic components in flexible electronic devices to produce a better reliability and durability of the devices.

SUMMARY

The present disclosure provides a novel method of laser-based fabrication of CNT-metal composites onto a flexible substrate, and the fabricated CNT-metal composites bonded with the flexible substrate. The composites fabricated on flexible substrates may have high electrical conductivities and longer bending-fatigue lives than laser-sintered metal of the same type without CNTs. Hence, the fabricated composites on flexible substrates can potentially help enhance the reliability and durability of flexible electronic devices by replacing or partially replacing the metallic components in the devices.

In one embodiment, the present disclosure provides a method to fabricate a CNT-metal composite onto a flexible substrate, wherein the method comprises:

a) dispersing CNTs and metal nanoparticles in a liquid, wherein the CNTs, the metal nanoparticles and the liquid are free or substantially free of any polymer matrix;

b) dispensing a controlled amount of the liquid containing CNTs and metal nanoparticles onto one side of the flexible substrate, wherein the dispensed material is free or substantially free of any polymer matrix; and drying the dispensed material into a solid mixture comprising CNTs and metal nanoparticles; and c) sintering the solid mixture through laser irradiation to form a CNT-metal composite bonded onto the flexible substrate.

In one embodiment, the present disclosure provides CNT-metal composites fabricated onto flexible substrates with the aforementioned method.

DETAILED DESCRIPTION

For the purposes of promoting an understanding of the principles of the present disclosure, reference will now be made to the embodiments. It will nevertheless be understood that no limitation of the scope of this disclosure is thereby intended.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 94%, within 95%, within 96%, within 97%, within 98% or within 99% of a stated value or of a stated limit of a range.

In the present disclosure the term "nanoparticles" refers to particles with average particle size range between 1-50000 nm, 1-10000 nm, 1-1000 nm, 1-900 nm, 1-800 nm, 1-700 nm, 1-600 nm, 1-500 nm, 1-400 nm, 1-300 nm, 1-200 nm, 1-100 nm, 1-90 nm, 1-80-nm, 1-70 nm, 1-60 nm, 1-50 nm, 1-40 nm, 1-30 nm, 1-20 nm, 1-10 nm or any combination thereof.

In the present disclosure, the term "fatigue life" refers to the number of bending cycles when the transient normalized average electrical resistivity of the related material reaches 10 during a fatigue bending test, wherein the minimum radius of curvature for the tested material is about 1 mm during each bending cycle in the bending test.

In the present disclosure, the term "laser sintering" generally refers to any process, wherein the laser irradiation of a material comprising particles and/or CNTs leads to one or more of: coalition between particles, bonding between one CNT and one particle (or more particles), bonding between one particle (or more particles) and a flexible substrate, or bonding between one CNT (or more CNTs) and a flexible substrate. During laser sintering, one or more of: material diffusion, material flow, or material phase changes, such as melting and solidification, may occur.

In the present disclosure, the term "flexible substrate" generally refers to a substrate that can be used as a substrate in flexible electronics devices. In practice, such substrates materials may often be polymers, which may include but are not limited to polymers such as, polyethylene terephthalate (PET), polycarbonate (PC), polyimide (PI), polyethylene naphthalate (PEN), polyetherimide (PEI), or any other suitable plastic/polymeric flexible material.

In the present disclosure, the term "nanoparticles" includes particles in any shape, which can be a spherical or non-spherical shape (including, but not limited to, a wire shape and a flake shape).

In one embodiment, the present disclosure provides a method to fabricate a carbon nanotube (CNT)-metal composite onto a flexible substrate, wherein the method comprises:

a) dispersing CNTs and metal nanoparticles in a liquid, wherein the CNTs, the metal nanoparticles and the liquid are free or substantially free of any polymer matrix;

b) dispensing a controlled amount of the liquid containing CNTs and metal nanoparticles onto one side of the flexible substrate, wherein the dispensed material is free or substantially free of any polymer matrix; and drying the dispensed material into a solid mixture comprising CNTs and metal nanoparticles; and c) sintering the solid mixture through laser irradiation to form a CNT-metal composite bonded onto the flexible substrate.

In one aspect of the disclosure, the "liquid" may include any suitable liquid that can provide a good dispersion of CNTs and metal nanoparticles in the liquid and that can be suitably dispensed onto the flexible substrate and then dried. The liquid may include (but is not limited to): ethanol, methanol, propanol, butanol, pentanol, isopropyl alcohol, ketones, water or any combination thereof. To produce good dispersion of CNTs and metal nanoparticles in the liquid, multiple treatments of the liquid through stirring and ultrasonication may be needed.

In one aspect of the disclosure, the liquid containing CNTs and metal nanoparticles can be dispensed with any suitable dispensing or printing device. In particular, it can be dispensed with a dispensing or printing device, wherein the dispensing tip has an inner diameter of 0.2 mm or smaller. The dispensing tip can have a controlled and flexible relative motion above the flexible substrate, and the trajectory of the motion can be controlled, programmed and flexibly changed. As a result, the liquid containing CNTs and metal nanoparticles can be dispensed into different and controlled patterns in selected surface regions, or the whole surface region, of the flexible substrate. A small inner diameter of the dispensing tip orifice (0.2 mm or smaller) can be chosen to get relatively high spatial resolutions in the dispensing process to form desired patterns without affecting the surrounding surface regions of the flexible substrate (which may be desirable in many related fabrication applications). On the other hand, a dispensing tip with a relatively large orifice diameter can also be used when a high dispensing efficiency is needed or desired. After the dispensed liquid containing CNTs and metal nanoparticles is dried, a mixture comprising CNTs and metal nanoparticles can be obtained on the flexible substrate, and the mixture is in a controlled pattern in selected surface regions, or the whole surface region, of the flexible substrate. The pattern may include a straight line or other types of patterns. Typically, in the fabrication method of this disclosure, before dispensing the liquid onto the flexible substrate, there is no mandatory need or exclusion of any additional treatment or processing of the flexible substrate surface, such as substrate material removal from the surface or coating of any other material onto the surface, etc. The flexible substrate may comprise, but not necessarily be limited to, one layer of one material, one layer of multiple materials, multiple layers of one material, or multiple layers of multiple materials.

In one aspect of the disclosure, after laser irradiation of the mixture comprising CNTs and metal nanoparticles, the whole or a portion of the mixture will be sintered into a CNT-metal composite. The un-sintered portion can be washed away using an organic liquid. During laser sintering, in one aspect of the disclosure, the mixture comprising CNTs and metal nanoparticles may need to be placed in an inert gas ambient environment to avoid or decrease possible harmful chemical reactions with air, and the inert gas may include (but is not limited to) argon and helium. The inert gas may be applied through a gas nozzle or through a chamber in which the sample is placed.

In one embodiment, the laser used in laser sintering in the method of the present disclosure can be a continuous-wave laser. In another embodiment, the laser used in laser sintering may also be a pulsed laser that emits laser pulses with a duration within the range of 10 femtoseconds to 100 milliseconds. During laser sintering, laser parameters may include (but not necessarily be limited to) laser spot size, laser spot moving speed on the solid mixture surface, laser beam power, laser wavelength, the number of laser scans, laser pulse energy, pulse duration and pulse frequency (when a pulsed laser is used). During laser sintering, the laser parameters may have to be suitably chosen such that: (1) the laser irradiation can realize sufficient and suitable material coalition and/or bonding in order to obtain a CNT-metal composite with high electrical conductivity, good bonding with the substrate and good fatigue properties; and (2) the laser irradiation does not generate significant thermal damages or other undesirable effects to the flexible substrate or the other surrounding surface regions of the substrate.

In one embodiment, the method of the present disclosure provides laser sintered CNT-metal composite fabricated onto a flexible substrate, wherein the laser sintered CNT-metal composite has a thickness of 0.001-5 µm, wherein the laser sintered CNT-metal composite has a fatigue life of at least 200 bending cycles, wherein the fatigue life is defined as the number of bending cycles when the transient normalized average electrical resistivity of the related material reaches 10 during the fatigue bending test, wherein the minimum radius of curvature for the tested material is about 1 mm during each bending cycle of the bending test. In one aspect, the laser sintered CNT-metal composite has a fatigue life of at least 300 bending cycles, 500 bending cycles, 700 bending cycles, 1000 bending cycles, 2000 bending cycles, 3000 bending cycles. In one aspect, the laser sintered CNT-metal composite has a fatigue life of about 200-10000 bending cycles, 200-5000 bending cycles, 200-3000 bending cycles, 500-5000 bending cycles, 500-3000 bending cycles, 1000-5000 bending cycles, 1000-3000 bending cycles, or more than 3000 bending cycles.

In one embodiment, the laser sintered CNT-metal composite provides an electrical conductivity of at least 50,000 S/cm, 60,000 S/cm, 70,000 S/cm, or 80,000 S/cm. In one aspect, the electrical conductivity is about 50,000-120,000 S/cm, 60,000-120,000 S/cm, 70,000-120,000 S/cm, or 80,000-120,000 S/cm.

In one embodiment, the thickness of the CNT-metal composite after the laser irritation is about 0.001-500 µm, 0.001-100 µm, 0.001-10 µm, 0.001-5 µm, 0.1-5 µm, 1-5 µm, 0.001-4 µm, 0.1-4 µm, 1-4 µm, 0.001-3 µm, 0.1-3 µm, 1-3 µm, 0.001-2 µm, 0.1-2 µm, or 1-2 µm.

In one embodiment, the metal particles used to prepare the CNT-metal mixture are nanoparticles with average particle size range between 1-50000 nm, 1-10000 nm, 1-1000 nm, 1-900 nm, 1-800 nm, 1-700 nm, 1-600 nm, 1-500 nm, 1-400 nm, 1-300 nm, 1-200 nm, 1-100 nm, 1-90 nm, 1-80-nm, 1-70 nm, 1-60 nm, 1-50 nm, 1-40 nm, 1-30 nm, 1-20 nm, 1-10 nm or any combination thereof.

In one embodiment, the weight ratio of CNTs to metal nanoparticles in the dispensed mixture is about 0.1 to 100, 0.2 to 100. 0.3 to 100. 0.4 to 100. 0.5 to 100, 0.6 to 100, 0.7 to 100, 0.8 to 100, 0.9 to 100, 1 to 100, 2 to 100, 3 to 100, 4 to 100, 5 to 100, 6 to 100, 7 to 100, 8 to 100, 9 to 100, 10 to 100, 20 to 100 or any ratio within the aforementioned range.

In one embodiment, a suitable dispersing agent may be used to help the dispersion of CNTs and/or metal particles in the liquid to substantially homogenously disperse the CNTs and/or metal particles in the liquid. A suitable dispersing agent may be, but is not limited to sodium dodecyl sulfate.

In one embodiment of the present invention, the laser sintering is capable of sintering without significant thermal damages to the flexible substrate.

In one embodiment of the present invention, metal is selected from the group that may include (but is not limited to) silver (Ag), gold (Au), copper (Cu), nickel (Ni), platinum (Pt), ruthenium (Ru), tin (Sn), palladium (Pd), and any combination thereof.

In one embodiment of the present invention, the electrical conductivity of the fabricated CNT-metal composite is 5%-20%, 7%-20%, 10%-20%, 15%-20%, or more than 20% of that for the bulk metal of the same type.

In one embodiment of the present disclosure, the laser irradiation is provided through a laser spot that relatively moves on the surface of the dispensed solid mixture at a speed of at least 2 mm/s, 3 mm/s, 4 mm/s, 5 mm/s, 6 mm/s, 7 mm/s, 8 mm/s, 9 mm/s, 10 mm/s, or 20 mm/s.

The novel fabrication method in the present disclosure has potential advantages such as: (1) Different and controlled patterns of the CNT-metal composites can be flexibly produced onto flexible substrates without the need of a vacuum or mask; (2) The fabrication process can avoid significant thermal damages or other significant undesirable effects to the flexible substrate or the surrounding surface regions of the flexible substrate; and (3) A high spatial resolution of fabrication can be achieved by using a small laser spot.

As an illustration of the disclosed novel fabrication method, experimental research was conducted (Zheng Kang, Benxin Wu, Ruoxing Wang and Wenzhuo Wu, "Laser-based Fabrication of Carbon Nanotube—Silver Composites with Enhanced Fatigue Performance onto a Flexible Substrate", Journal of Manufacturing Science and Engineering, submitted). In the experiment, CNTs and silver nanoparticles (NPs) were dispersed in 95% ethanol, where SDS (sodium dodecyl sulfate) was also added to help the dispersion. To get good dispersion of CNTs and silver particles in ethanol, a multi-step procedure of mixing, stirring (using a magnetic stirrer) and ultra-sonication treatment (using an ultrasonic cleaner) was followed. In the prepared liquid, the weight ratio of CNTs to silver NPs was ~1:100, and the silver nanoparticles had a concentration of ~0.45 g/ml. The liquid was then dispensed into lines on a polyimide film substrate through a pressure-based fluid dispensing system (using a dispensing tip whose orifice has an inner diameter of 0.2 mm), and was then dried in the air. As a result, mixture lines comprising CNTs and silver NPs were obtained on the polyimide substrate surface. Then, the mixture line was laser-sintered through laser irradiation of the mixture line in an ambient environment of argon gas applied through a container with a glass cover. In laser sintering, the employed laser (SPI G3.0) was operated in the continuous-wave mode with a wavelength of ~1064 nm, and the relative moving speed of laser spot on the mixture line surface was ~20 mm/s. The sintering was performed by scanning the laser spot on each mixture line once or twice using a laser scan head. The portions of the mixture lines that were not sintered were washed away by an organic liquid.

The sintered samples were observed using a scanning electron microscope. The electrical conductivity of the sintered material was measured through the four-point probe method using a multimeter, an optical microscope and a white-light interferometer. Fatigue bending tests were performed on the sintered lines. The polyimide film had the sintered line on its top surface and its bottom surface was bonded with a plastic support layer through an adhesive layer in between (the polyimide film together with the adhesive and plastic support layers has a total thickness of ~135 μm). In the test, one end of the plastic support was connected with a fixed panel, and the other end was connected with a panel moving back and forth. Each moving cycle has a period of ~1.3 second and a total travel distance of ~90 mm. As a result, the sintered line went through cyclic bending deformations. In each cycle, the minimum radius of curvature induced in the sintered line was estimated to be ~1 mm. The real-time electrical resistance during the bending test was measured, where the two-probe method was used. It was approximately assumed that the measured total electrical resistance change was due to the resistance change in the portion of the line where major cracks mainly occurred. Based on this assumption, the transient average electrical resistivity of the sintered material in this portion of the line during the bending test was approximated determined and then normalized by the line initial resistivity before the test. In this way, from each bending test a curve of the normalized electrical resistivity versus the number of bending cycles was obtained. A fatigue life was defined as the number of bending cycles when the transient normalized resistivity reached 10. A sintered silver line and a CNT-silver composite line with a similar thickness and sintered using around the same laser power and the same number of laser scans were put into one comparison group. Tests for multiple groups were performed.

Under the studied conditions and for the observed, measured or tested samples, the following was found: the observations of some sintered samples using a scanning electron microscope showed that laser irradiation led to coalition of nanoparticles into a medium that was relatively more continuous, and CNTs still existed in the sintered samples, and they appeared to be bonded with the matrix medium based on the observations in the SEM images. The average electrical conductivity of CNT-silver composite lines produced through double-scan laser sintering under an applied laser power was measured to be ~$1.1 \times 10^5$ S cm$^{-1}$. The conductivity was lower under a lower laser power. On the other hand, if the applied laser power was too high, clearly observable damages could be generated on the polyimide substrate. The average electrical conductivity of laser-sintered CNT-silver composite lines was typically slightly higher than laser-sintered silver lines under the same laser power and the same number of laser scans. The fatigue bending tests showed that among eight tested comparison groups, almost every CNT-silver composite line exhibits a longer fatigue life than the silver line in the same group, with one exception where the fatigue lives of the two lines do not differ too much. Out of the eight tested CNT-silver composite lines, six lines have a fatigue life longer than 500 cycles and four lines near or longer than 1000 cycles. However, every one of the eight tested silver lines has a fatigue life shorter than 500 cycles. Therefore, overall the laser-sintered CNT-silver composite lines have much longer fatigue lives than laser-sintered silver lines without CNTs.

Those skilled in the art will recognize that numerous modifications can be made to the specific implementations described above. The implementations should not be limited to the particular limitations described. Other implementations may be possible. A fabrication process similar to that introduced in this disclosure is considered as included in this invention, regardless of the applied metal nanoparticles (NPs) type, size or shape, the CNT type, size or shape, the concentration of metal NPs and CNTs in the liquid or dispensed mixture, the type of the liquid and the dispersion agent, the type of the dispensing or printing device or approach used, the type, size and shape of the flexible substrate, the type and parameters of the laser and the associated optics, the type of inert gas and the way the inert gas is applied during sintering, etc.

I claim:

1. A method to fabricate a carbon nanotube (CNT)—metal composite onto a flexible substrate, wherein the method comprises:
    a) dispersing CNTs and metal nanoparticles in a liquid, wherein the CNTs, the metal nanoparticles and the liquid are free or substantially free of any polymer matrix;
    b) dispensing a controlled amount of the liquid containing CNTs and metal nanoparticles onto one side of the flexible substrate, wherein the dispensed material is free or substantially free of any polymer matrix; and drying the dispensed material into a solid mixture comprising CNTs and metal nanoparticles; and
    c) sintering the solid mixture through laser irradiation to form a CNT-metal composite bonded onto the flexible substrate,
    wherein the laser irradiation is provided through a laser spot that relatively moves on the surface of the dispensed solid mixture at a speed of at least 2 mm/s,
    wherein the weight percentage ratio of CNTs to metal nanoparticles in the solid mixture is within the range of 0.2:100 to 5:100,
    wherein the electrical conductivity of the fabricated CNT-metal composite is at least 5% of that for the bulk metal of the same type.

2. The method of claim 1, wherein the thickness of the CNT-metal composite after the laser irritation is 0.001-5 µm.

3. The method of claim 1, wherein the metal is selected from the group consisting of the group consisting of silver (Ag), gold (Au), copper (Cu), nickel (Ni), platinum (Pt), ruthenium (Ru), tin (Sn), palladium (Pd), and any combination thereof.

4. The method of claim 1, wherein the sintered CNT-metal composite has a fatigue life of at least 200 bending cycles, wherein the fatigue life is defined as the number of bending cycles when the transient normalized average electrical resistivity of the related composite reaches 10 during the fatigue bending test, wherein the minimum radius of curvature for the sintered composite is about 1 mm for each bending cycle during the fatigue test.

5. The method of claim 1, wherein the electrical conductivity of the fabricated CNT-metal composite is at least 10% of that for the bulk metal of the same type.

6. The method of claim 1, wherein the liquid contains ethanol and SDS (sodium dodecyl sulfate).

7. The method of claim 1, wherein the laser irradiation is provided through a laser spot that relatively moves on the surface of the dispensed solid mixture at a speed of at least 10 mm/s.

8. The method of claim 1, wherein the liquid is dispensed by a dispensing or printing device, wherein the dispensing or printing tip of the device has at least one orifice and the inner diameter of each orifice is 0.2 mm or smaller.

9. The method of claim 1, wherein the laser is a continuous-wave laser.

10. The method of claim 1, wherein the laser is a pulsed laser that emits laser pulses with a duration within the range of 10 femtoseconds to 100 milliseconds.

11. The method of claim 1, wherein during laser sintering the solid mixture is in an ambient environment comprising an inert gas.

12. The method of claim 1, wherein after laser irradiation the un-sintered portions of the solid mixture can be washed away from the flexible substrate using an organic liquid.

13. The method of claim 1, wherein the liquid containing CNTs and metal nanoparticles is dispensed into controlled patterns in selected surface regions of the flexible substrate.

14. The method of claim 1, wherein the laser-sintered CNT-metal composite has a longer fatigue life than laser-sintered metal of the same type on the flexible substrate using a method similar to the method of claim 1 but without CNTs, wherein the fatigue life is defined as the number of bending cycles when the transient normalized average electrical resistivity of the related material reaches 10 during the fatigue bending test, wherein the minimum radius of curvature for the tested material is about 1 mm for each bending cycle during the fatigue test.

* * * * *